(12) United States Patent
Katayama et al.

(10) Patent No.: US 8,512,831 B2
(45) Date of Patent: Aug. 20, 2013

(54) LAMINATE AND, PAPER CONTAINER AND PACKAGE USING THE SAME

(75) Inventors: Shin'ya Katayama, Shizuoka (JP); Hirofumi Fujisaki, Shizuoka (JP); Tomonori Murata, Okayama (JP)

(73) Assignee: Tokyo Paper Mfg. Co., Ltd., Fujinomiya, Shizuoka (JP)

(*) Notice: Subject to any disclaimer, the term of this patent is extended or adjusted under 35 U.S.C. 154(b) by 427 days.

(21) Appl. No.: 10/537,226

(22) PCT Filed: Jul. 25, 2003

(86) PCT No.: PCT/JP03/09462
§ 371 (c)(1), (2), (4) Date: Jun. 2, 2005

(87) PCT Pub. No.: WO2004/050358
PCT Pub. Date: Jun. 17, 2004

(65) Prior Publication Data
US 2006/0051537 A1  Mar. 9, 2006

(30) Foreign Application Priority Data

Dec. 3, 2002 (JP) ................................. 2002-350898

(51) Int. Cl.
*B32B 1/02* (2006.01)
*B32B 29/00* (2006.01)
*B32B 27/10* (2006.01)

(52) U.S. Cl.
USPC .................. 428/34.2; 428/35.7; 428/479.6

(58) Field of Classification Search
USPC ........... 428/34.2, 35.7, 511, 513, 34.6, 479.6; 503/227
See application file for complete search history.

(56) References Cited

U.S. PATENT DOCUMENTS

| | | | | |
|---|---|---|---|---|
| 4,623,587 A | * | 11/1986 | Ito et al. | 428/335 |
| 5,059,459 A | | 10/1991 | Huffman | |
| 5,196,469 A | * | 3/1993 | Cushing et al. | 524/300 |
| 5,358,785 A | * | 10/1994 | Akao et al. | 428/349 |

(Continued)

FOREIGN PATENT DOCUMENTS

| | | |
|---|---|---|
| DE | 10030635 | 1/2002 |
| GB | 919065 | 2/1963 |

(Continued)

OTHER PUBLICATIONS

Certified translation of JP 09058650 Mar. 4, 1997.*

(Continued)

*Primary Examiner* — Erik Kashnikow
(74) *Attorney, Agent, or Firm* — Westerman Hattori Daniels & Adrian, LLP

(57) ABSTRACT

The present invention relates to a laminate which has oxygen barrier property and flavor barrier property and which is excellent in sealing property and anti-delamination property, and to a paper container and a package utilizing the laminate and suitable for long term storage of contents and excellent in disposability.

The laminate is characterized in that the same comprises a multi resin layer including at least three layers comprising adhesive resin layer (a)/barrier resin layer (b)/adhesive resin layer (a') coextrusion laminated onto a base paper coated with polyethylene imine such that the adhesive resin layer (a) is contacted with the coated surface of the base paper, thereby enhancing an adhesion strength between the coextrusion laminated resin layer and the base paper, with lower odor and excellent barrier property.

24 Claims, 1 Drawing Sheet

(56) References Cited

U.S. PATENT DOCUMENTS

| | | | |
|---|---|---|---|
| 5,384,187 A * | 1/1995 | Uemura et al. | 442/59 |
| 5,942,320 A * | 8/1999 | Miyake et al. | 428/216 |
| 6,974,612 B1 * | 12/2005 | Frisk et al. | 428/34.2 |
| 7,285,334 B1 * | 10/2007 | Yamashita et al. | 428/458 |
| 2003/0181567 A1 | 9/2003 | Dames | |

FOREIGN PATENT DOCUMENTS

| | | | |
|---|---|---|---|
| JP | 58-160244 A | | 9/1983 |
| JP | 60-112874 A | | 6/1985 |
| JP | 05229070 | | 9/1993 |
| JP | 5229070 | | 9/1993 |
| JP | 07016993 | | 1/1995 |
| JP | 09-058650 | * | 3/1997 |
| JP | 9-58650 A | | 3/1997 |
| JP | 10-218170 A | | 8/1998 |
| WO | WO-93/22131 | | 11/1993 |
| WO | WO-9322131 | | 11/1993 |
| WO | WO-99/24505 A1 | | 5/1999 |
| WO | WO00/44632 | * | 4/2000 |
| WO | 00/53414 A1 | | 9/2000 |

OTHER PUBLICATIONS

Communication from the European Patent Office dated Jan. 26, 2009 in connection with Application No. 03 812 268.5.

Annex to the European Search Report on European Application No. EP 03 81 2268.

European Examination Report dated Jun. 22, 2010, issued in corresponding European Patent Application No. 03812268.5.

* cited by examiner

LAMINATE AND, PAPER CONTAINER AND PACKAGE USING THE SAME

CROSS REFERENCE TO RELATED APPLICATIONS

This is a U.S. national phase application under 35 U.S.C. §371 of International Patent Application No. PCT/JP2003/09462, filed Jul. 25, 2003, and claims benefit of Japanese Patent Application No. JP 2002-350898, filed Dec. 3, 2002 which is incorporated by reference herein. The International Application was published in Japanese on Jun. 17, 2004 as WO 2004/050358 A1 under PCT Article 21(2).

TECHNICAL FIELD

The present invention relates to a laminate, and a paper container and a package using the same, and more particularly to a structure, which has oxygen barrier property against oxygen tending to permeate through the paper container from the outside, and flavor barrier property for preventing dissipation of flavor components of contents to the outside of the paper container (these barrier properties may be simply called "barrier properties" hereinafter), and which is excellent in sealing property, anti-delamination property, and disposability as a package.

BACKGROUND ART

In paper containers suitable for long term storage of contents thereof, it is required to prevent degradation of the contents to thereby require oxygen barrier property against oxygen tending to permeate through the paper containers from the outside, and flavor barrier property for preventing dissipation of flavor components of the contents to the outside of the paper containers, so that laminated paper including an aluminum foil as a constituent member has been used. Further, there has been recently used a laminated paper having exemplarily bonded thereto a coextruded film combiningly including a deposited inorganic film, a resin having a barrier property, or the like, instead of an aluminum foil.

However, since the process for laminating these films onto a base paper is complicated and costly, it has recently started to use laminates each obtained by laminating a barrier resin onto a base paper by a coextrusion laminating method.

In case of a conventional laminate to be obtained by laminating a barrier resin onto a base paper by the coextrusion laminating method, the laminate has been typically produced by coextrusion laminating a resin layer of such a 3-kind/5-layer configuration including low-density polyethylene/adhesive resin/barrier resin/adhesive resin/low-density polyethylene, onto a base paper surface. However, it is impossible in this configuration to obtain a sufficient adhesion strength between the base paper and the low-density polyethylene, unless the temperature of the molten resin layer (hereinafter called "processing temperature" as the case may be) is set at about 315° C. or higher.

However, in case of adoption of ethylene-vinyl alcohol copolymer as the barrier resin, for example, the ethylene-vinyl alcohol copolymer tends to cause thermal decomposition at 290° C. or higher, thereby problematically and frequently causing a situation where the barrier resin is thermally degraded or gelated within an extruder such that the copolymer is unabled to be kept as a molten film to thereby cause film breakage, at such higher processing temperatures.

Further, it has been likely that the adhesive resin and low-density polyethylene also tend to cause thermal decomposition, oxidative degradation and the like, thereby possibly causing the laminate itself to become severe in odor.

It is thus conceivable to lower the processing temperature by applying an ozone treatment to that low-density polyethylene surface of the molten resin layer which is to be adhered to the base paper. However, even in this case, it is impossible to obtain a sufficient adhesion strength between the base paper and the low-density polyethylene, when the temperature of the low-density polyethylene is no higher than 290° C., at the highest.

As means for solving such a problem, there has been proposed a method for previously providing a low-density polyethylene layer on a base paper surface, and by coextrusion laminating a resin layer of a 3-kind/5-layer configuration onto it, in JP 6-55485 B, for example.

However, even in this method, there is possibly caused a defective adhesion between the low-density polyethylene layer previously provided on the base paper surface and the low-density polyethylene of the coextruded resin layer, when the processing temperature is no higher than 280° C., thereby resulting in a narrow range of processing temperature for enabling an actual processing. Moreover, this method exhibits another problem that the production process requires an excessive step so as to previously provide the low-density polyethylene layer on the base paper surface.

Meanwhile, there have been proposed a producing method of a laminate by a multi-layer coextrusion laminating method. For example, disclosed in JP 7-16993 A is a method for coextrusion laminating a resin layer of 3-kind/3-layer comprising ethylene-vinyl alcohol copolymer/adhesive resin/polyolefin onto a base paper, such that the ethylene-vinyl alcohol copolymer side is faced to the base paper side.

Although this method enables production of a laminate at certainly lower processing temperatures, it is problematic that the extruded ethylene-vinyl alcohol copolymer in a molten state is directly contacted with air until the former is contacted with the base paper, thereby causing oxidative degradation. Further, bumps on the base paper surface are directly transferred to the ethylene-vinyl alcohol copolymer layer, such that the ethylene-vinyl alcohol copolymer layer is brought to have a non-uniform thickness when the layer is thin at about 10 μm or less, thereby possibly resulting in a deteriorated barrier property.

DISCLOSURE OF THE INVENTION

The present invention provides a laminate comprising a multi resin layer including at least three layers comprising adhesive resin layer (a)/barrier resin layer (b)/adhesive resin layer (a') coextrusion laminated onto a base paper coated with polyethylene imine such that the adhesive resin layer (a) is contacted with the coated surface of the base paper, so that the coextrusion laminated multi resin layer and the base paper are adhered to each other through the polyethylene imine, thereby enabling obtainment of the laminate which is high in adhesion strength, with lower odor and excellent barrier property.

It is possible to provide a thermoplastic resin layer (c) outside the adhesive resin layer (a').

It is preferable that the barrier resin layer (b) comprises an ethylene-vinyl alcohol copolymer having an ethylene content of 15 to 60 mol % and a saponification degree of 90% or more.

It is desirable that the temperature of the molten resin layer upon coextrusion lamination is set at 290° C. or lower at a die outlet.

It is possible to provide a heat sealing layer on the base paper at a position other than the coextrusion laminated surface thereof.

It is also possible to provide a contents-contacting layer on the coextrusion laminated surface.

When the laminate is formed into a paper container, the obtained paper container can be made excellent in oxygen barrier property against oxygen tending to permeate through the paper container from the outside and excellent in flavor barrier property for preventing dissipation of flavor components of contents to the outside of the paper container, and can be made excellent in sealing property, anti-delamination property, disposability as a container packing, and effective in long term storage of the contents.

BEST MODE FOR CARRYING OUT THE INVENTION

Figure 1:
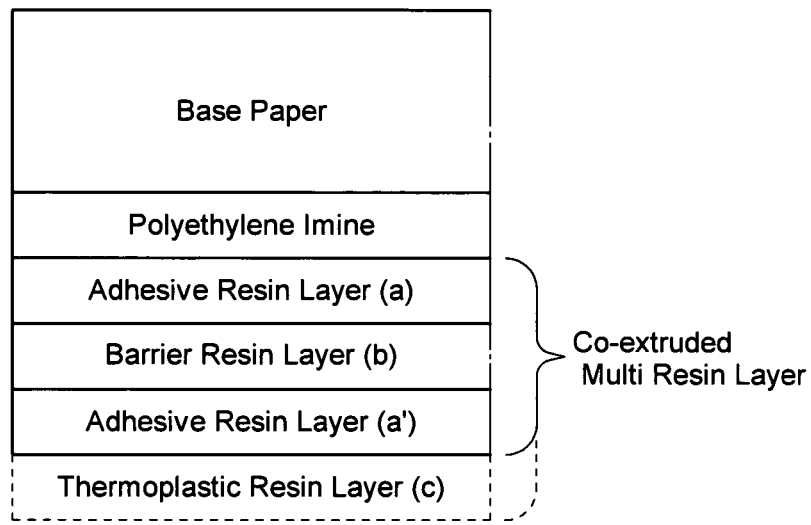
FIG. 1 is a schematic view of a laminate according to an embodiment of the present invention.
Figure 2:
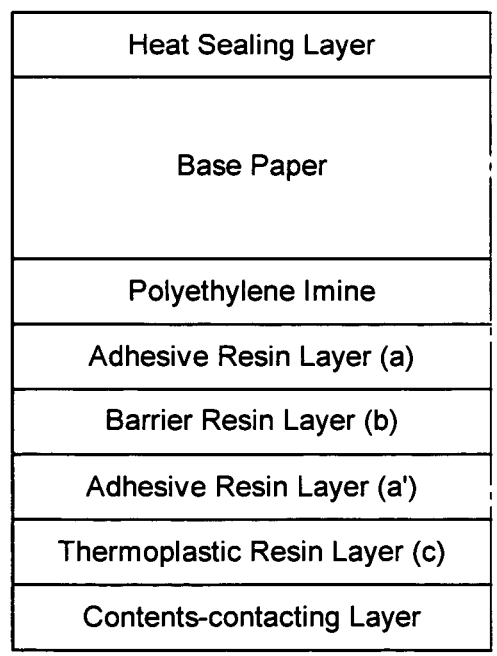
FIG. 2 is a schematic view of a laminate according to another embodiment of the present invention.

There will be explained a laminate, and a paper container and a package using the same, as well as embodiments of the paper container and the package using the laminate, all of which fall within a scope of the present invention.

In the description, low-density polyethylene is expressed as LDPE, ethylene-vinyl alcohol copolymer as EVOH, and adhesive resin as Tie in some cases.

Firstly, it is enough for base paper to be sheet formed from natural fiber, synthetic fiber, or mixture thereof, without particularly limited thereto.

Examples of natural fibers to be used for sheet formation include: wood fibers such as softwood pulp and hardwood pulp; plant fibers such as pulps of cotton yarn, sugarcane, bamboo, and hemp; and animal fibers such as wool and silk.

Further, examples of the above-mentioned synthetic fibers include fibered polyethylene, polypropylene, polyester, polyamide, and cellulose acetate.

Among base papers obtained from these fibers, those are desirable which include 30 wt. % or more, more desirably 50 wt. % or more of wood fibers or plant fibers, from a standpoint of mechanical property, thermal property and the like.

Further, it is possible to include a sizing agent, fixing agent, paper strengthening agent, wet paper strengthening agent, dye, and loading material, as required.

It is also possible to apply clay court, gravure or the like.

For the above-mentioned base paper, it is required to coat polyethylene imine onto at least that surface of the base paper which is subjected to coextrusion lamination as described later.

Polyethylene imine is obtained by ring-opening polymerization of ethylene imine by using an acid catalyst, and is generally represented by the following formula 1, while the polyethylene imine may be provided without denaturation as represented or in a denatured form to be described later:

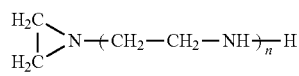
[Formula 1]

As an example of denaturation, it is possible to adopt denatured polyethylene imine as represented by the following formula 2:

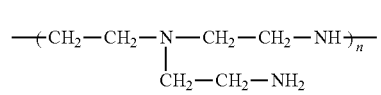
[Formula 2]

In addition to the above, it is also possible to adopt such denatured polyethylene imine as represented by the following formula 3:

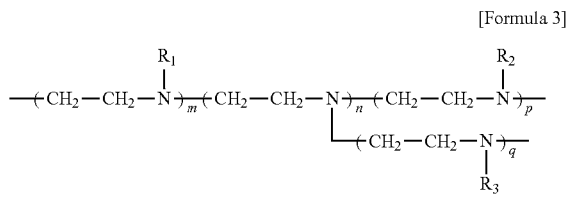
[Formula 3]

in the formula 3, $R_1$ through $R_3$ each represent hydrogen, an alkyl group, alkenyl group, benzyl group, or a cyclic hydrocarbon residue.

In addition to the above, it is possible to adopt variously denatured ones.

Examples of methods for coating polyethylene imine include: a method for adding polyethylene imine into a coating liquid in a size pressing process or calendering process upon sheet formation of base paper; a method for coating polyethylene imine by a printing machine or coater; and a method for in-line anchor coating polyethylene imine just before extrusion lamination by a coextrusion laminator.

Usable as coating methods in the printing machine, coater, and in-line anchor coater, are gravure coating, roll coating, and the like.

The coating amount of polyethylene imine is preferably in a range of 0.001 to 1.0 g/m², more desirably 0.005 to 0.5 g/m², as a solid content.

Coating amounts less than 0.001 g/m² may lead to insufficient adhesion of a resin layer to be coextrusion laminated, and coating amounts exceeding 1.0 g/m² may rather obstruct the adhesion due to the excessive coating amount.

Next, used as a barrier resin layer (b) is a barrier resin for restricting permeation of oxygen and flavor components, which possesses oxygen barrier property against oxygen susceptible to permeate, from the outside, through a paper container obtained by forming the laminate, and flavor barrier property for preventing dissipation of flavor components of the contents to the outside of the paper container.

Examples of the barrier resin include polyamide, polyester, polyvinylidene chloride, ethylene-vinyl alcohol copolymer (so-called EVOH), and the like.

Examples of the polyamide include noncrystalline polyamide, nylon-6, nylon-66, a copolymer of metaxylene diamine and dicarboxylic acid, and the like.

Examples of the polyester include polyethylene glycol terephthalate, polybutylene glycol terephthalate, polyethylene glycol naphthalate, and the like.

Although these barrier resins can be appropriately selected and used as the barrier resin layer (b) depending on required properties to be demanded for a paper container, the EVOH is most preferable among the above in consideration of a balance between the barrier properties for restricting permeation of oxygen and flavor components and the coextrusion lamination processing suitability.

The EVOH is obtained by saponifying a copolymer of ethylene and vinyl ester, by using an alkali catalyst or the like.

Representative examples of vinyl ester include vinyl acetate, and other aliphatic vinyl esters may be used.

Ethylene contents of the EVOH are 15 to 60 mol %, preferably 20 to 55 mol %, and more preferably 25 to 50 mol %.

Ethylene contents less than 15 mol % lead to deteriorated gas barrier properties at high humidities, and lead to deteriorated coextrusion lamination processing suitabilities. Further, ethylene contents exceeding 60 mol % fail to obtain sufficient gas barrier suitabilities.

Further, saponification degrees of vinyl ester components of the EVOH are required to be 90% or more, preferably 96% or more, and more preferably 98% or more.

Saponification degrees less than 90% not only deteriorate gas barrier properties at high humidities but also deteriorate thermal stabilities of the EVOH, thereby easily causing gelation/babbles in formed bodies.

Preferable melt flow rates (MFR) (based on JIS K7210 under a load of 2,160 g at 210° C.) of the EVOH are 1 to 45 g/10 min, preferably 3 to 35 g/10 min, and more preferably 7 to 25 g/10 min.

The barrier resin layer (b) may be provided by solely using one of the above-mentioned barrier resins, by blending a plurality of kinds of different barrier resins or a plurality of different property grades of the same barrier resin, or by preparing multiple layers such as two layers.

It is also possible to add inorganic fillers or the like into the barrier resin layer (b) to thereby further enhance the barrier property thereof.

Next, the adhesive resin layer (a) is to be bonded to the base paper coated with polyethylene imine, and the MFR (under a load of 2,160 g at 190° C.: note that all descriptions of MFR's other than MFR's for EVOH represent values at 190° C.) of the adhesive resin layer is to be within a range of 0.5 to 20 g/10 min, and more desirably 1 to 15 g/10 min in consideration of an adhesive property to the base paper surface.

MFR's less than 0.5 g/10 min lead to excessively higher viscosities upon melting so that biting of the molten resin into the base paper surface is decreased, thereby making it difficult to obtain a physical adhesive force.

MFR's exceeding 20 g/10 min lead to excessively lower melt viscosities, thereby possibly obstructing stability of a molten film.

The adhesive resin layer (a') is required to possess an adhesive capability for bonding the barrier resin layer (b) to a thermoplastic resin layer (c) to be described later, or to a contents-contacting layer.

Usable as the adhesive resin layer (a) and adhesive resin layer (a') are: graft polymers obtained by graft polymerizing unsaturated carboxylic acid such as maleic acid or anhydride thereof, with polyolefin resin such as low-density polyethylene or straight chain low-density polyethylene, very-low-density polyethylene, or polypropylene; and copolymers of olefin such as ethylene, with maleic acid, acrylic acid, methacrylic acid, vinyl acetate, acrylic acid ester, methacrylic acid ester, and the like.

The adhesive resin layer (a) and adhesive resin layer (a') may be made of the same resin or different resins.

Next, it is also effective in this laminate, to provide a thermoplastic resin layer (c) outside the adhesive resin layer (a').

In this case, usable as the thermoplastic resin layer (c) are those which preferably possess heat sealing property required for forming a paper container from a laminate, including polyolefin resins such as low-density polyethylene or straight chain low-density polyethylene, very-low-density polyethylene, polypropylene, and sealing polyester.

In case of adopting polyolefin resin as the thermoplastic resin, the MFR of the polyolefin resin is preferably within a range of 0.5 to 20 g/10 min, and more desirably 1 to 15 g/10 min.

MFR's less than 0.5 g/10 min lead to insufficient heat sealing properties, and MFR's exceeding 20 g/10 min lead to excessively lower melt viscosities to thereby possibly obstruct stability of a molten film.

The adhesive resin layer (a), barrier resin layer (b), and adhesive resin layer (a') are coextrusion laminated onto that surface of a base paper which has a polyethylene imine coating applied thereto by a coextrusion laminator, thereby obtaining a laminate.

In conducting the above, it is enough to achieve coextrusion lamination of a multi resin layer including at least three layers comprising adhesive resin layer (a)/barrier resin layer (b)/adhesive resin layer (a'), and it is also possible to achieve coextrusion lamination of a multi resin layer of four-layer configuration comprising adhesive resin layer (a)/barrier resin layer (b)/adhesive resin layer (a')/thermoplastic resin layer (c) by addition of the thermoplastic resin layer (c) as described above.

At this time, the adhesive resin layer (a) side of the multi resin layer is laminated to the base paper side, thereby enhancing an adhesion strength between the base paper side and the multi resin layer.

The temperature (processing temperature) of the molten multi resin layer at this time is preferably made as low as possible.

Higher processing temperatures exceeding 315° C. lead to generation of abnormal odor components such as due to thermal degradation, oxidation and/or decomposition of the adhesive resin and/or thermoplastic resin in the multi resin layer, thereby resulting in a laminate which is severe in odor.

Further, when EVOH is adopted as the barrier resin layer (b), the EVOH tends to cause thermal decomposition at processing temperatures at 290° C. or higher, so that the barrier resin is thermally degraded or gelated within an extruder such that the layer is unabled to be kept as a molten film to thereby cause film breakage, at such higher processing temperatures.

Thus, the processing temperature is preferably set at 290° C. or lower.

Even at such low processing temperatures, the base paper is coated with polyethylene imine so that the adhesion strength between the base paper and the adhesive resin layer (a) in the multi resin layer is made strong by virtue of the polyethylene imine.

When the base paper is not coated with polyethylene imine, it is impossible to obtain a sufficient adhesion strength between the base paper and the adhesive resin layer (a) in the multi resin layer.

Further, even when the base paper was coated with polyethylene imine, there was not obtained a sufficient adhesion strength if the adhesive resin laminated to the base paper is LDPE.

While polyethylene imine has been conventionally used as an anchor coating agent for adhering LDPE onto a difficult-to-adhesion substrate by extrusion lamination, there can be obtained a sufficient adhesion strength only when the processing temperature is kept at 300° C. or higher upon extrusion lamination of LDPE.

Contrary, the present invention utilizes the base paper coated with polyethylene imine and the adhesive resin layer (a) is used at a surface side of the multi resin layer and extrusion laminated, thereby enabling obtainment of an enhanced adhesion strength even at processing temperatures of 300° C. or lower, and further at lower processing temperatures at about 250° C. for LDPE and other adhesive resins.

Next, while the thicknesses of the layers in the multi resin layer to be coextruded may be appropriately determined depending on the usage, respectively, it is particularly desirable that the thickness of the barrier resin layer (b) is set at 0.5 to 30 μm, and more desirably 1 to 25 μm.

Thicknesses less than 0.5 μm lead to a possibility of insufficient barrier property and film breakage upon film formation.

Thicknesses exceeding 30 μm lead to excessively enhanced mechanical properties such as bending strength and repulsive force of the laminate, thereby possibly causing inconvenience for formation suitability upon forming a paper container from the laminate.

Concerning the thickness of the adhesive resin layer (a), the thickness of the layer bonded to the base paper side is to be set at 1 μm or more, and desirably 2 μm or more.

Thicknesses less than 1 μm cause bumps at the base paper surface side to be transferred to the barrier resin layer (b), such that the barrier resin layer (b) is brought to have a non-uniform thickness when the layer is thin at about 10 μm or less, thereby possibly resulting in a deteriorated barrier property.

Further, the thickness of the adhesive resin layer (a') for bonding the barrier resin layer (b) to the thermoplastic resin layer (c) is made 0.5 μm or more, and desirably 1 μm or more.

Thicknesses less than 0.5 μm make it difficult to obtain a sufficient adhesion strength in bonding between the barrier resin layer (b) and thermoplastic resin layer (c), and may cause film breakage.

In case of provision of the thermoplastic resin layer (c), its thickness is made 2 μm or more, desirably 5 μm or more.

Thicknesses less than 2 μm make it difficult to obtain a heat sealing strength required upon forming a paper container from the laminate.

In the laminate obtained in the above manner, it is possible to provide a heat sealing layer on that surface of the base paper which is opposite to the coextrusion laminated surface.

Providing the heat sealing layer facilitates heat sealing between portions of the heat sealing layer itself or between the heat sealing layer and the surface of the laminate opposite to the heat sealing layer, upon forming a paper container from the laminate.

The heat sealing layer may be provided after application of printing to the base paper surface, and may be previously provided before conducting coextrusion lamination onto the reverse surface of the base paper.

In providing the heat sealing layer, it is effective to laminate the same onto a base paper surface by extrusion lamination, and examples of usable resins include polyolefin resins such as low-density polyethylene or straight chain low-density polyethylene, very-low-density polyethylene, polypropylene, and sealing polyester.

In case of adopting polyolefin resin as the heat sealing layer, the MFR of the polyolefin resin is preferably within a range of 0.5 to 20 g/10 min, and more desirably 1 to 15 g/10 min.

MFR's less than 0.5 g/10 min lead to insufficient heat sealing properties upon formation of a paper container from the laminate, and MFR's exceeding 20 g/10 min lead to decreased hot tacking property to thereby easily causing such a problem that the once established heat sealing is broken in formation of a paper container.

The thickness of the heat sealing layer is preferably 3 to 100 μm, and more desirably 5 to 50 μm.

Thicknesses less than 3 μm make it difficult to obtain a sufficient heat sealing strength. Thicknesses exceeding 100 μm lead to excessively enhanced mechanical properties such as bending strength and repulsive force of the laminate, thereby possibly causing inconvenience for formation suitability upon forming a paper container from the laminate.

Further, it is possible to conduct gravure printing, offset printing, and flexographic printing, outside the heat sealing layer. In such a case, it is desirable to apply corona treatment or flame treatment onto an outer surface of the heat sealing layer.

Moreover, it is also effective in the laminate to provide a contents-contacting layer on the coextrusion laminated adhesive resin layer (a'), or on the thermoplastic resin layer (c) provided outside it.

This can be achieved: by laminating a polyolefin resin or sealing polyester, which is similar to the thermoplastic resin layer (c), as the contents-contacting layer by extrusion lamination; or by laminating a separately prepared film acting as a contents-contacting layer, by sandwich laminating method, upon coextrusion laminating a multi resin layer of 3-layer configuration comprising adhesive resin layer (a)/barrier resin layer (b)/adhesive resin layer (a') or 4-layer configuration comprising adhesive resin layer (a)/barrier resin layer (b)/adhesive resin layer (a')/thermoplastic resin layer (c) onto that surface of the base paper which has been coated with polyethylene imine.

Another method is to laminate a film acting as a contents-contacting layer by a sandwich laminating method, while laminating a polyolefin resin or the like similar to the thermoplastic resin layer (c) onto the adhesive resin layer (a') of the laminate or onto the thermoplastic resin layer (c) provided outside the adhesive resin layer (a') by extrusion lamination.

Examples of films usable as the contents-contacting layer include those formed of polyolefin resins such as low-density polyethylene or straight chain low-density polyethylene, very-low-density polyethylene, and polypropylene, by inflation method or T-diecast process.

In case of adopting a polyolefin resin as a film acting as the contents-contacting layer, the MFR of the polyolefin resin is preferably within a range of 0.5 to 20 g/10 min, more desirably 1 to 15 g/10 min.

MFR's less than 0.5 g/10 min lead to insufficient heat sealing properties upon formation of a paper container from the laminate, and MFR's exceeding 20 g/10 min lead to decreased hot tacking property to thereby easily causing such a problem that the once established heat sealing is broken in formation of a paper container.

Further, the thickness of the film comprising the polyolefin resin is preferably 10 to 100 μm, and more desirably 15 to 80 μm.

Thicknesses less than 10 μm of the film make it difficult to form the same with a stabilized thickness upon producing the same. Thicknesses exceeding 100 μm lead to excessively enhanced mechanical properties such as bending strength and repulsive force of the laminate, thereby possibly causing inconvenience for formation suitability upon forming a paper container from the laminate.

Further, in case of adopting a film as the contents-contacting layer, it is also possible to form a coextruded film or composite film exemplarily comprising LDPE/adhesive resin/polyester or LDPE/adhesive resin/EVOH, and to use the film by positioning the LDPE side as the coextrusion laminated surface of the laminate.

To the laminate obtained in the above manner, it is possible to apply working such as printing, creasing, die cutting, edge protection, body sealing, bottom formation, top formation, lid sealing and the like as required, thereby allowing production of paper containers of various configurations and sizes depending on the contents and usages of the paper containers.

Examples of shapes of a paper container to be formed include gable top type, flat top type, tetrahedral type, cup type, cylindrical type, bag type, tray type, and the like, and the laminated paper of the present invention is usable as a member for a body portion of them, and as a bottom member and/or lid member thereof.

By adopting, as constituent members of these paper containers, the above described laminate which is low in odor, excellent in barrier property, and high in adhesion strength between the coextrusion laminated multi resin layer and the base paper side, it becomes possible to obtain a paper container, which is excellent in oxygen barrier property against oxygen tending to permeate through the paper container from the outside and excellent in flavor barrier property for preventing dissipation of flavor components of contents to the outside of the paper container, and which is effective for long term storage of the contents.

Further, in case of filling contents into the paper container and using them as a package, it is possible to fill contents in various states and shapes such as liquids, powders, granules, solids, semisolids, and pastes whether the contents are edible or inedible.

For example, when the contents are liquids, examples thereof include: liquid beverages including soft drinks such as fruit juice, isotonic drink, coffee beverage, tea type beverage such as oolong tea and green tea, mineral water, alcohol beverages including Japanese sake, wine, whisky, white distilled liquor, and milk beverages such as milk and fermented milk; liquid foods such as soup, pottage, noodle sauce, broth; liquid condiments such as soy sauce, sauces, dips; and edible oils such as vegetable oil.

The container can be effectively used for the inedibles including daily necessities such as liquid detergents, shampoos, rinses, as well as mineral oils and machining oils.

The same is particularly suitable as a package for the liquid beverages, particularly for soft drinks, among the above described ones.

Further, when the contents are not classified as liquids, the container may also be used for foods including: semisolid foods such as yogurt and ice cream; pastes such as jam, mayonnaise, fermented soybean paste; dry powders or granules such as instant coffee, condiments, tea leaf; and processed solid foods such as snacks, noodles, hams, and instant foods.

The container is also effective for inedibles including: daily necessities such as bath agents and powder soap; chemicals such as herbicides and agricultural chemicals; electronic parts and machine parts; and industrial materials such as printing ink and adhesive. The package is suitable for edibles among the above described ones, and particularly for yogurt, jam, and the like.

Although the present invention will be described hereinafter based on Examples, the present invention is not limited thereto.

Note that the following materials are used in coextrusion lamination in the following Examples and Comparative Examples, unless otherwise mentioned.

Low-density polyethylene (LDPE) used as the thermoplastic resin layer (c) was "PETROTHENE 204" (name of product manufactured by TOSOH CORPORATION; MFR=7 g/10 min).

EVOH used as the barrier resin layer (b) was "EVAL C109" (name of product manufactured by KURARAY CO., LTD.; MFR (210° C.)=16 g/10 min).

Used as the adhesive resin layer (a) and adhesive resin layer (a') (Tie) were each "ADMER AT-1188" (name of product manufactured by MITSUI CHEMICALS, INC.; MFR=6 g/10 min) which is graft modified polyolefin.

Further, evaluating methods described in Examples and Comparative Examples are as follows:

(1) Adhesion Strength of Base Paper/Coextruded Resin Layer (Multi Resin Layer)

Each sample was cut into 15 mm width, and the peel strength of the base paper/coextruded resin layer was measured by "AUTOGRAPH AGS-500D" which is a tensile tester manufactured by SHIMADZU CORPORATION.

The measuring condition was set at a head speed of 300 mm/min, and the adhesion strength was provided by an averaged peel strength upon peeling of a length of 50 mm. Measurement was conducted three times to note an averaged value. The adhesion strength was judged to be excellent in evaluation, when the adhesion strength was 100 gf/15 mm or more or when the paper layer was broken and thus the measurement was unabled.

(2) Barrier Property

As an index for evaluating the barrier property, there was measured an oxygen permeability of each sample by using an oxygen permeability measuring device OX-TRAN10/50A manufactured by ModernControl Co., Ltd.

The measuring condition was set at a humidity of 65% RH at a temperature of 20° C. Measurement was conducted two times to note an averaged value. The oxygen permeability was judged to be excellent in evaluation, when the oxygen permeability was 10 ml/$m^2$·Day·atm or less.

(3) Odor Evaluation 0.5 $m^2$ of each sample was placed within a desiccator with a suction cock, and left for 15 minutes at 20° C., and then the cock was connected to an odor sensor "XP-329" manufactured by NEW COSMOS ELECTRIC CO., LTD. and the cock was opened to suck air within the desiccator for measurement of odor strength.

Note that the odor level in the laboratory was regarded as a zero level, and the maximum value indicated by the odor sensor was adopted as an applicable odor strength. Measurement was conducted two times to note an averaged value.

The odor was judged to be excellent in evaluation when the value indicated by the odor sensor was 500 or less.

(4) Taste Sense Test

Prepared as a comparative sample was a laminated paper having a configuration of LDPE (20 μm)/base paper (milk carton oriented base paper manufactured by WEYERHAEUSER Co., Ltd.; basis weight=313 g/$m^2$)/LDPE (20 μm)/aluminum foil (7 μm)/ethylene-methacrylic acid copolymerization resin (15 μm)/LDPE (20 μm), and formed from this laminated paper was a gable top type carton as a container having a volume of 900 ml in a structure where cross-sections of the laminated paper were not exposed to the inside of the container, followed by filling of commercially available orange juice thereinto.

Further, the same carton was formed from each of laminates of Examples and Comparative Examples, and filled with the same orange juice.

The cartons made of the laminates of Examples and Comparative Examples, respectively, and the carton as the Comparative Sample using the aluminum foil were each stored in a refrigerator for two weeks after filling, and the tastes of the orange juice therein were mutually compared and evaluated with scores by eight panelists.

The scores were based on the taste of the orange juice in the carton using the aluminum foil such that each score was evaluated as 5 point when the taste concerning the carton comprising a laminate of an applicable one of Examples and Comparative Examples was more excellent than that concerning the carton using the aluminum foil, 4 point in case of the same evaluation, 3 point when the taste was felt to be slightly degraded, 2 point when the taste was felt to be apparently degraded, and 1 point when strange taste was felt, and the total of points given by the panelists was adopted as a taste evaluation score.

Each taste evaluation score was judged to be excellent when the same was 26 points or more.

EXAMPLE 1

Used as a base paper was a milk carton oriented base paper manufactured by WEYERHAEUSER Co., Ltd. (basis weight: 313 g/m$^2$), and polyethylene imine was gravure coated onto a reverse surface of the base paper by an in-line anchor coater of a coextrusion laminator.

Note that the adopted and gravure coated polyethylene imine was "AC-108" (name of product manufactured by DAINIPPON INK AND CHEMICALS, INCORPORATED; denatured polyethylene imine at a solid content concentration of 0.8%) at such a formulation that "AC-108":isopropyl alcohol=1:2 (weight ratio). At this time, the coating amount was 5 g/m$^2$ and the solid content coating amount of polyethylene imine was 0.013 g/m$^2$.

Coextrusion laminated by the coextrusion laminator onto that surface of the base paper which was coated with the polyethylene imine, was a multi resin layer comprising the adhesive resin layer (a)/barrier resin layer (b)/adhesive resin layer (a')/thermoplastic resin layer (c) (this order is also kept in the following Examples and Comparative Examples), such that the Tie (a) side of the multi resin layer having a 3-kind/4-layer configuration including Tie (5 μm)/EVOH (5 μm)/Tie (5 μm)/LDPE (20 μm) came to the base paper side. At this time, the extrusion temperature (processing temperature) of the molten multi resin layer was set at 280° C.

Further, laminated onto that base paper surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1.

All items resulted in excellent evaluation.

Furthermore, prepared from the laminate was a gable top type carton as described above, and the result of taste sense test conducted therefor is also shown in Table 1.

Excellent evaluation was resultingly obtained.

EXAMPLE 2

Used as a base paper was a "single-side coated cup base paper" (name of product manufactured by TOKYO PAPER MFG. CO., LTD.; basis weight of 285 g/m$^2$) including a surface having clay court applied thereto, and the clay court surface of the base paper was subjected to gravure printing and the uncoated surface of the base paper was wholly coated with polyethylene imine by reverse coating in the gravure printing process. Note that the formulation and coating amount of polyethylene imine were the same as those in Example 1.

Coextrusion laminated by the coextrusion laminator onto that surface of the base paper which was coated with the polyethylene imine, was a multi resin layer having a 3-kind/4-layer configuration including Tie (5 μm)/EVOH (10 μm)/Tie (5 μm)/LDPE (35 μm), such that the Tie (a) side came to the base paper side. At this time, the processing temperature was set at 265° C.

Further, laminated onto that printed surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1.

All items resulted in excellent evaluation.

Furthermore, prepared from the laminate was a gable top type carton as described above, and the result of taste sense test conducted therefor is also shown in Table 1. Excellent evaluation was resultingly obtained.

EXAMPLE 3

There was sheet formed a "cup base paper" (name of product manufactured by TOKYO PAPER MFG. CO., LTD.; basis weight of 220 g/m$^2$) by a Fourdrinier paper machine.

At this time, coated onto both surfaces of the base paper as a coating material in a calendering process, was aqueous polyvinyl alcohol including "EPOMIN P-1000" (name of product manufactured by NIPPON SHOKUBAI CO.; solid content concentration of 30%) as polyethylene imine. Note that the addition ratio of "EPOMIN" into the coating material was set to achieve 3 wt. %. At this time, the coating amount was 20 g/m$^2$ for one surface, and the solid content coating amount of polyethylene imine was 0.180 g/m$^2$.

Coextrusion laminated by the coextrusion laminator onto the reverse surface of the base paper was a multi resin layer having a 3-kind/4-layer configuration including Tie (5 μm)/EVOH (10 μm)/Tie (5 μm)/LDPE (35 μm), such that the Tie (a) side came to the base paper side.

At this time, the processing temperature was set at 240° C. Further, laminated onto that base paper surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1. All items resulted in excellent evaluation.

Furthermore, prepared from the laminate was a gable top type carton as described above, and the result of taste sense test conducted therefor is also shown in Table 1. Excellent evaluation was resultingly obtained.

EXAMPLE 4

Used as a base paper was a milk carton oriented base paper manufactured by WEYERHAEUSER Co., Ltd. (basis weight: 313 g/m$^2$), and polyethylene imine was gravure coated onto a reverse surface of the base paper by an in-line anchor coater of a coextrusion laminator, in the same manner as Example 1.

Coextrusion laminated by the coextrusion laminator onto that surface of the base paper which was coated with the polyethylene imine, was a multi resin layer having a 3-kind/4-layer configuration including Tie (5 μm)/EVOH (5 μm)/Tie (5 μm)/LDPE (5 μm), such that the Tie (a) side came to the base paper side; and at the same time, drawn out of a film stand placed in the laminator was a metallocene-based straight chain low-density polyethylene film "SUZULON L V941" (name of product manufactured by AICELLO CHEMICAL CO., LTD.; 30 µm) as a contents-contacting layer, and laminated by a sandwich laminating method onto the LDPE (5 µm) surface of the resin layer to be coextrusion laminated and having the 3-kind/4-layer configuration.

Note that the extrusion temperature (processing temperature) of the molten multi resin layer having the 3-kind/4-layer configuration was set at 280° C.

Further, laminated onto that base paper surface which was not coextrusion laminated, was "PETROTHENE 204" (20 µm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1. All items resulted in excellent evaluation.

Furthermore, prepared from the laminate was a gable top type carton as described above, and the result of taste sense test conducted therefor is also shown in Table 1.

Excellent evaluation was resultingly obtained.

EXAMPLE 5

There was prepared a coextruded inflation film having a 3-layer configuration of LDPE (20 µm)/Tie (5 µm)/polyester (15 µm). In preparing this film, used as the LDPE was "MIRASON 18SP" (name of product manufactured by MITSUI CHEMICALS, INC.), and so was "ADMER SF730" (name of product manufactured by MITSUI CHEMICALS, INC.) as the Tie. Further, used as the polyester was "KURAPET KL576K" (name of product manufactured by KURARAY CO., LTD.) which is saturated noncrystalline polyester.

Used as a base paper was a milk carton oriented base paper manufactured by WEYERHAEUSER Co., Ltd. (basis weight: 313 g/m$^2$), and polyethylene imine was gravure coated onto a reverse surface of the base paper by an in-line anchor coater of a coextrusion laminator, in the same manner as Example 4.

Further, there was conducted lamination by the sandwich laminating method while conducting coextrusion lamination, in the same manner as Example 4 except that the coextruded inflation film was used as a contents-contacting layer instead of "SUZULON L V941". In this case, the LDPE side of the coextruded inflation film was positioned to face to the LDPE (5 µm) side of the resin layer having a 3-kind/4-layer configuration to be coextrusion laminated.

Further, laminated onto that base paper surface which was not coextrusion laminated, was "PETROTHENE 204" (20 µm) consisting of LDPE acting as a heat sealing layer, by extrusion lamination.

The results of evaluation conducted for an adhesion strength, barrier property, and odor of base paper/coextruded resin layer of thus obtained laminate are shown in Table 1. All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 6

Used as a base paper was a "Sake-Pack base paper" (name of product manufactured by TOKYO PAPER MFG. CO., LTD.; basis weight of 400 g/m$^2$), and polyethylene imine was gravure coated onto a reverse surface of the base paper by the in-line anchor coater of the coextrusion laminator in the same manner as Example 1.

Coextrusion laminated by the coextrusion laminator onto that surface of the base paper which was coated with the polyethylene imine, was a multi resin layer having a 3-kind/4-layer configuration including Tie (5 µm)/EVOH (5 µm)/Tie (5 µm)/LDPE (5 µm) such that the Tie side of the multi resin layer came to the base paper side. Note that processing temperature was set at 240° C.

Further, extrusion laminated onto the coextrusion laminated LDPE (5 µm) side was "PETROTHENE 204" (40 µm) as a contents-contacting layer.

Moreover, laminated onto that base paper surface which was not coextrusion laminated, was "PETROTHENE 204" (20 µm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1. All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 7

Used as a base paper was a "Sake-Pack base paper" (basis weight of 400 g/m$^2$), and polyethylene imine was gravure coated onto a reverse surface of the base paper by the in-line anchor coater of the coextrusion laminator in the same manner as Example 1.

Coextrusion laminated by the coextrusion laminator onto that surface of the base paper which was coated with the polyethylene imine, was a multi resin layer having a 3-kind/4-layer configuration including Tie (5 µm)/EVOH (5 µm)/Tie (5 µm)/LDPE (5 µm) such that the Tie (a) side of the multi resin layer came to the base paper side. Note that processing temperature was set at 240° C.

Further, extrusion laminated onto the coextrusion laminated LDPE (c) side was "PETROTHENE 204" (20 µm), and there was simultaneously laminated a metallocene-based straight chain low-density polyethylene film "SUZULON L V941" as a contents-contacting layer by a sandwich laminating method.

Moreover, laminated onto that base paper surface which was not coextrusion laminated, was "PETROTHENE 204" (20 µm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1.

All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 8

There was prepared a laminate in the same manner as Example 2, except that there was used "REXPEARL ET 182" (name of product manufactured by JAPAN POLYOLEFINS CO., MFR=8 g/10 min) consisting of ethylene-based copolymer as the Tie to be used for coextrusion lamination, instead of "ADMER AT-1188".

The results of evaluation conducted for an adhesion strength, barrier property, and odor of base paper/coextruded resin layer of thus obtained laminate are shown in Table 1. All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 9

There was prepared a laminate in the same manner as Example 2, except that there were used: "MX nylon 6007" (name of product manufactured by MITSUBISHI GAS CHEMICAL COMPANY, INC.) consisting of polyamide and having a layer thickness of 20 μm, instead of EVOH; and "ADMER NF505" (name of product manufactured by MITSUI CHEMICALS, INC.; MFR=3.5 g/10 min) instead of "ADMER AT-1188" as the Tie; both to be used for coextrusion lamination.

The results of evaluation conducted for an adhesion strength, barrier property, and odor of base paper/coextruded resin layer of thus obtained laminate are shown in Table 1.

All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 10

Used as a base paper was a "single-side coated cup base paper" (basis weight of 285 g/m²), and the clay court surface of the base paper was subjected to gravure printing and the uncoated surface of the base paper was wholly coated with polyethylene imine by reverse coating in the gravure printing process. Note that the formulation and coating amount of polyethylene imine were the same as those in Example 1.

Coextrusion laminated by the coextrusion laminator onto that surface of the base paper which was coated with the polyethylene imine, was a multi resin layer having a 4-kind/5-layer configuration including Tie (5 μm)/EVOH (5 μm)/nylon (5 μm)/Tie (5 μm)/LDPE (35 μm), such that the Tie (a) side came to the base paper side. In this case, used as the Tie and nylon were "ADMER NF500" (name of product manufactured by MITSUI CHEMICALS, INC.; MFR=1.8 g/10 min) and "UBE nylon 1022C2" (name of product manufactured by UBE INDUSTRIES, LTD.), respectively. At this time, the processing temperature was set at 265° C.

Further, laminated onto that printed surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded resin layer of thus obtained laminate are shown in Table 1.

All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 11

Used as a base paper was a "Sake-Pack base paper" (basis weight of 400 g/m²), and polyethylene imine was gravure coated onto a reverse surface of the base paper by the in-line anchor coater of the coextrusion laminator in the same manner as Example 1.

Coextrusion laminated by the coextrusion laminator onto that surface of the base paper which was coated with the polyethylene imine, was a multi resin layer having a 2-kind/3-layer configuration including Tie (5 μm)/EVOH (5 μm)/Tie (5 μm). Note that processing temperature was set at 240° C.

Further, extrusion laminated onto the coextrusion laminated Tie (a') side was "PETROTHENE 204" (40 μm) as a contents-contacting layer.

Moreover, laminated onto that base paper surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded resin layer of thus obtained laminate are shown in Table 1.

All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 12

Used as a base paper was a "Sake-Pack base paper" (basis weight of 400 g/m²), and polyethylene imine was gravure coated onto a reverse surface of the base paper by the in-line anchor coater of the coextrusion laminator in the same manner as Example 1.

Coextrusion laminated by the coextrusion laminator onto that surface of the base paper which was coated with the polyethylene imine, was a multi resin layer having a 2-kind/3-layer configuration including Tie (5 μm)/EVOH (5 μm)/Tie (5 μm). Note that processing temperature was set at 240° C.

Further, extrusion laminated onto the coextrusion laminated Tie (a') side was "PETROTHENE 204" (20 μm), and there was simultaneously laminated a metallocene-based straight chain low-density polyethylene film "SUZULON L V941" as a contents-contacting layer by a sandwich laminating method.

Moreover, laminated onto that base paper surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded resin layer of thus obtained laminate are shown in Table 1. All items resulted in excellent evaluation. Furthermore, prepared from the laminate was a gable top type carton as described above, and the result of taste sense test conducted therefor is also shown in Table 1. Excellent evaluation was resultingly obtained.

EXAMPLE 13

Used as a base paper was a "Sake-Pack base paper" (basis weight of 400 g/m²), and polyethylene imine was gravure coated onto a reverse surface of the base paper by the in-line anchor coater of the coextrusion laminator in the same manner as Example 1.

Coextrusion laminated by the coextrusion laminator onto that surface of the base paper which was coated with the polyethylene imine, was a multi resin layer having a 2-kind/3-layer configuration including Tie (5 μm)/EVOH (5 μm)/Tie (5 μm).

At the same time, drawn out of a film stand placed in the laminator was a metallocene-based straight chain low-density polyethylene film "SUZULON L V941" as a contents-contacting layer, and laminated by a sandwich laminating method. Note that the processing temperature was set at 280° C.

Further, laminated onto that base paper surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1.

All items resulted in excellent evaluation. Furthermore, prepared from the laminate was a gable top type carton as described above, and the result of taste sense test conducted therefor is also shown in Table 1. Excellent evaluation was resultingly obtained.

COMPARATIVE EXAMPLE 1

There was prepared a laminate in the same manner as Example 1, except that polyethylene imine was not coated on a reverse surface of a base paper.

The results of evaluation conducted for an adhesion strength, barrier property, and odor of base paper/coextruded multi resin layer of thus obtained laminate are shown in Table 1.

Although the results of evaluation of barrier property and odor were excellent, the adhesion strength of the base paper/coextruded resin layer was low and unsatisfactory due to absence of polyethylene imine coating as compared with Example 1. Further, it was tried to prepare a gable top type carton from the laminate in the above described manner, and resulted in failure due to the low adhesion strength of the base paper/coextruded resin layer.

COMPARATIVE EXAMPLE 2

There was prepared a laminate in the same manner as Example 1, except that polyethylene imine was not coated on a reverse surface of a base paper, and that the processing temperature of coextrusion lamination was set at 315° C.

The results of evaluation conducted for an adhesion strength, barrier property, and odor of base paper/coextruded resin layer of thus obtained laminate are shown in Table 1.

Although the adhesion strength of the base paper/coextruded resin layer was excellent, the odor strength was severer than Example 1 and Comparative Example 1 and thus unsatisfactory, due to the processing temperature higher than that in Comparative Example 1. Further, there was prepared a gable top type carton from the laminate in the above described manner followed by a taste sense test therefor, resulting in unfavorable evaluation because of smelt resin odor.

COMPARATIVE EXAMPLE 3

Used as a base paper was a milk carton oriented base paper (basis weight: 313 g/m$^2$) manufactured by WEYERHAEUSER Co., Ltd., and polyethylene imine was coated onto a reverse surface of the base paper in the same manner as Example 1.

Coextrusion laminated by the coextrusion laminator onto that surface of the base paper which was coated with the polyethylene imine, was a multi resin layer having a 3-kind/5-layer configuration including LDPE (20 μm)/Tie (5 μm)/EVOH (5 μm)/Tie (5 μm)/LDPE (20 μm).

At this time, the extrusion temperature (processing temperature) of the molten resin layer was set at 280° C.

Further, laminated onto that base paper surface which was not coextrusion laminated, was "PETROTHENE 204" (20 μm) consisting of LDPE acting as a heat sealing layer, by extrusion lamination.

The results of evaluation conducted for an adhesion strength, barrier property, and odor of base paper/coextruded multi resin layer of thus obtained laminate are shown in Table 1.

Although the results of evaluation of barrier property and odor were excellent, the adhesion strength between the LDPE of the coextrusion laminated configuration and the base paper was low and unsatisfactory even when the polyethylene imine coating was present. Further, it was tried to prepare a gable top type carton from the laminate in the above described manner, and resulted in failure due to the low adhesion strength between the LDPE and the base paper.

COMPARATIVE EXAMPLE 4

There was prepared a laminate in the same manner as Example 3, except that polyethylene imine was not coated on a reverse surface of a base paper, and that the processing temperature of coextrusion lamination was set at 315° C.

The results of evaluation conducted for an adhesion strength, barrier property, and odor of base paper/coextruded multi resin layer of thus obtained laminate are shown in Table 1.

Although the evaluation result for barrier property was excellent and the adhesion strength of the base paper/coextruded multi resin layer was excellent, the odor strength was severe and unsatisfactory, due to the processing temperature higher than that in Comparative Example 3. Further, there was caused partial film breakage in the EVOH layer upon coextrusion lamination working of the 5 layers in 3 kinds. Moreover, there was prepared a gable top type carton from the laminate in the above described manner followed by a taste sense test therefor, resulting in unfavorable evaluation because of smelt resin odor.

TABLE 1

|  | Adhesion strength gf/15 mm | Oxygen permeability ml/m$^2$ · day · atm | Odor strength sensor value | Taste point | Remarks |
|---|---|---|---|---|---|
| Ex. 1 | Paper layer breakage | 2.4 | 340 | 31 |  |
| Ex. 2 | Paper layer breakage | 1.3 | 250 | 32 |  |
| Ex. 3 | Paper layer breakage | 1.1 | 220 | 35 |  |
| Ex. 4 | Paper layer breakage | 2.2 | 390 | 29 |  |
| Ex. 5 | Paper layer breakage | 1.8 | 330 | 36 |  |
| Ex. 6 | Paper layer breakage | 2.5 | 290 | 29 |  |
| Ex. 7 | Paper layer breakage | 2.4 | 250 | 30 |  |
| Ex. 8 | Paper layer breakage | 1.1 | 300 | 33 |  |
| Ex. 9 | Paper layer breakage | 5.2 | 340 | 28 |  |
| Ex. 10 | Paper layer breakage | 2.0 | 310 | 29 |  |
| Ex. 11 | Paper layer breakage | 2.3 | 290 | 30 |  |

TABLE 1-continued

|  | Adhesion strength gf/15 mm | Oxygen permeability ml/m²·day·atm | Odor strength sensor value | Taste point | Remarks |
|---|---|---|---|---|---|
| Ex. 12 | Paper layer breakage | 2.3 | 270 | 33 |  |
| Ex. 13 | Paper layer breakage | 2.1 | 330 | 28 |  |
| Com. Ex. 1 | 60 | 2.8 | 380 | — | Unable to form paper container |
| Com. Ex. 2 | Paper layer breakage | 2.7 | 930 | 18 |  |
| Com. Ex. 3 | 25 | 2.3 | 320 | — | Unable to form paper container |
| Com. Ex. 4 | Paper layer breakage | 2.5 | 1080 | 12 | Occurrence of film breakage in EVOH layer upon coextrusion lamination |

As apparent from the results of Table 1, excellent results were obtained for the laminates according to the present invention in terms of adhesion strengths, barrier properties, and odor evaluation of the base paper/coextruded multi resin layers; contrary, although Comparative Examples 1 through 4 were excellent in evaluation for barrier property, they were unsatisfactory in adhesion strength or odor evaluation of the base paper/coextruded multi resin layers, and even a problem was caused in coextrusion lamination working process for Comparative Example 4.

Moreover, although the results of the taste sense test were excellent for the paper containers adopting the laminates according to the Examples of the present invention, strange taste was felt in Comparative Examples 2 and 4 thereby failing to obtain excellent evaluation.

The invention claimed is:

1. A laminate comprising a multi resin layer including at least three layers comprising an adhesive resin layer (a), a barrier resin layer (b), and an adhesive resin layer (a') coextrusion laminated onto a base paper, said base paper having a coating on the surface consisting of denatured polyethylene imine, such that said adhesive resin layer (a) is contacted with said coated surface of said base paper, said barrier resin layer (b) is contacted with said adhesive resin layer (a), and said adhesive resin layer (a') is contacted with said barrier resin layer (b), wherein the denatured polyethylene imine is represented by the following formula I or formula II: and
that said barrier resin layer (b) consists essentially of ethylene-vinyl alcohol copolymer:

formula I:

$$-(CH_2-CH_2-N-CH_2-CH_2-NH)_n-$$
$$\quad\quad\quad\quad\quad\; |$$
$$\quad\quad\quad\quad\; CH_2-CH_2-NH_2$$

formula II:

$$\quad\quad\quad\quad\quad R_1 \quad\quad\quad\quad\quad\quad\quad\quad\quad R_2$$
$$\quad\quad\quad\quad\quad | \quad\quad\quad\quad\quad\quad\quad\quad\quad |$$
$$-(CH_2-CH_2-N)_m-(CH_2-CH_2-N)_n-(CH_2-CH_2-N)_p-$$
$$\quad\quad\quad\quad\quad\quad\quad\quad\quad\quad\quad\quad |$$
$$\quad\quad\quad\quad\quad\quad\quad\quad\quad\quad (CH_2-CH_2-N)_q$$
$$\quad\quad\quad\quad\quad\quad\quad\quad\quad\quad\quad\quad |$$
$$\quad\quad\quad\quad\quad\quad\quad\quad\quad\quad\quad\quad R_3$$

wherein R1 and R3 each represent hydrogen, an alkyl group, alkenyl group, benzyl group, or a cyclic hydrocarbon residue;

and wherein the multi-resin layer is bondable, at 290° C. or lower at the outlet of the die, onto the base paper without thermal decomposition of the barrier resin layer.

2. The laminate of claim 1, wherein said multi resin layer comprises at least four layers including a thermoplastic resin layer (c) provided outside said adhesive resin layer (a').

3. The laminate of claim 1, wherein said adhesive resin layer (a) and said adhesive resin layer (a') comprise graft polymers obtained by graft polymerizing unsaturated carboxylic acid with polyolefin resin.

4. The laminate of claim 1, wherein said adhesive resin layer (a) and said adhesive resin layer (a') comprise copolymers of an olefin with maleic acid, acrylic acid, methacrylic acid, vinyl acetate, acrylic acid ester, and methacrylic acid ester.

5. The laminate of claim 1, wherein the EVOH is obtained by saponifying a copolymer of ethylene and vinyl ester, by using an alkali catalyst;
that the EVOH has an ethylene content of 15 to 60 mol %; and
that the vinyl ester component has a saponification degree of 90% or more.

6. The laminate of claim 5, wherein the EVOH has a melt flow rate (MFR) (based on JIS K7210 under a load of 2,160 g at 210° C.) of 1 to 45 g/10 min.

7. The laminate of claim 1, wherein said adhesive resin layer (a) has a thickness set at 1 μm or more, said barrier resin layer (b) has a thickness set at 0.5 to 30 μm, and said adhesive resin layer (a') has a thickness set at 0.5 μm or more.

8. The laminate of claim 2, wherein said thermoplastic resin layer (c) has a thickness set at 2 μm or more.

9. The laminate of claim 2, wherein said thermoplastic resin layer (c) comprises low-density polythylene, straight chain low-density polyethylene, very-low-density polyethylene or polypropylene.

10. The laminate of claim 9, wherein said thermoplastic resin layer (c) comprises a polyolefin resin having MFR in a range of 0.5 to 20 g/10 min.

11. The laminate of claim 1, wherein said adhesive resin layer (a) is adapted to be bonded to said base paper coated with polyethylene imine, and has an MFR (under load of 2,160 g at 190° C.) of 0.5 to 20 g/10 min.

12. The laminate of claim 1, characterized by a heat sealing layer provided on said base paper at a position other than the coextrusion laminated surface thereof 13. The laminate of claim 12, wherein said heat sealing layer comprises a polyolefin resin having an MFR set in a range of 0.5 to 20 g/10 min and a thickness set in a range of 3 to 100 μm.

14. The laminate of claim 1, characterized by a contents-contacting layer provided on the coextrusion laminated surface.

15. The laminate of claim 14, wherein said contents-contacting layer is laminated on the coextrusion laminated surface, by an extrusion laminating method.

16. The laminate of claim 14, wherein said contents-contacting layer is formed into a single layered or multi layered film, and laminated onto said coextrusion laminated multi resin layer by a sandwich laminating method.

17. The laminate of claim 14, wherein said contents-contacting layer is formed into a single layered or multi layered film, and laminated onto the coextrusion laminated surface via another resin by a sandwich laminating method.

18. The laminate of claim 14, wherein said contents-contacting layer comprises a polyolefin resin or sealing polyester.

19. A paper container obtained by forming said laminate of claim 1.

20. A package comprising said paper container of claim 19 containing contents filled therein.

21. The package of claim 20, wherein the contents are a soft drink.

22. The laminate of claim 3, wherein said unsaturated carboxylic acid is one of maleic acid and an anhydride thereof.

23. The laminate of claim 3, wherein said polyolefin resin is selected from the group consisting of low-density polyethylene, straight chain low-density polyethylene, and polypropylene.

24. The laminate of claim 4, wherein said olefin comprises ethylene.

* * * * *